United States Patent [19]

Bergman et al.

[11] 4,169,256
[45] Sep. 25, 1979

[54] DIGITALLY CONTROLLED OSCILLATOR

[75] Inventors: Jan Bergman, Haaksbergen; Klaas J. Luidens, Goor, both of Netherlands

[73] Assignee: Hollandse Signaalapparaten B.V., Hengelo, Netherlands

[21] Appl. No.: 825,306

[22] Filed: Aug. 17, 1977

[30] Foreign Application Priority Data

Aug. 26, 1976 [NL] Netherlands .......................... 7609475

[51] Int. Cl.² ............................................. G01S 9/66
[52] U.S. Cl. ..................................... 367/90; 325/307; 331/51; 331/60; 367/904
[58] Field of Search ....................... 340/3 D; 325/307; 331/51, 54, 60

[56] References Cited

U.S. PATENT DOCUMENTS

| 3,370,266 | 2/1968 | Taddeo et al. | 340/3 R |
| 3,810,038 | 5/1974 | Hershberg | 325/307 |

Primary Examiner—S. C. Buczinski
Attorney, Agent, or Firm—Thomas A. Briody; Edward J. Connors, Jr.; James J. Cannon, Jr.

[57] ABSTRACT

A digitally controlled oscillator is provided with a memory, storing the half periods $T_i (i=1, 2, ..., n)$ of corresponding frequencies $f_i = 1/(2T_i)$ to be generated, and with a digital feedback circuit, in which circuit the half periods taken from memory are decreased by a fixed time value $\tau$ on a time sharing basis, and in which circuit, as soon as the residual values $\Delta_{i,1} = T_i - k_{i,1}\tau < \tau$ are obtained, these residual values are increased by the corresponding half periods $T_i$ also on a time sharing basis, and each value so increased is repeatedly decreased by the fixed time $\tau$. On repeating this process j times, the residual values can be expressed by: $\Delta_{i,j} = T_i + \Delta_{i,j-1} - k_{i,j}\tau$, where each $k_{i,j}$ is so large that $0 \leq \Delta_{i,j} < \tau$. The digital feedback circuit is connected to n residual value counters, which are each supplied with a series of residual values $\Delta_{i,j}$ and which, on reaching a fixed value, bring about that a circuit connected to the respective counter produces a square-wave signal of frequency $f_i$.

6 Claims, 3 Drawing Figures

DIGITALLY CONTROLLED OSCILLATOR

BACKGROUND OF THE INVENTION

The invention relates to a digitally controlled oscillator and the application thereof in a sonar transmitter/receiver for compensating the frequency error in the sonar-detected target return signals, which error is due to the doppler shift through the motion of the sonar transmitter and receiver. Since the doppler shift follows a cosine function with respect to the direction of motion of the sonar transmitter/receiver, this frequency error differs for the various sonar receiver channels.

SUMMARY OF THE INVENTION

It is an object of the invention to provide a digitally controlled oscillator which, in response to computer-supplied data, generates simultaneously all those frequencies required to compensate for the frequency errors in the various sonar receiver channels.

According to the invention, the digitally controlled oscillator is provided with a memory, storing the half periods $T_i$ ($i=1, 2, \ldots, n$) of corresponding frequencies $f_i = 1/(2T_i)$ to be generated, and with a digital feedback circuit connected thereto, in which circuit the half periods taken from memory are each decreased by a fixed time value $\tau$ on a time sharing basis, and in which circuit, as soon as the residual values $\Delta_{i,1} = T_i - k_{i,1}\tau < \tau$, where $k_{i,1}$ is an integer are obtained, said residual values are increased by the corresponding half periods $T_i$ also on a time sharing basis, and each value so increased is repeatedly decreased by the fixed time $\tau$, whereby after the process of increasing by $T_i$ and repeatedly decreasing by $\tau$ has been performed j times the residual values can be expressed by: $\Delta_{i,j} = T_i + \Delta_{i,j-1} - k_{i,j}\tau$, where each $k_{i,j}$ is so large, that $0 \leq \Delta_{i,j} < \tau$, and whereby the digital feedback circuit is connected to n residual value counters, which are each supplied with a series of residual values $\Delta_{i,j}$ and which, on reaching a fixed value after writing of a residual value from the respective series, deliver a signal to a circuit connected to the respective counter, which circuit converts the applied signals into a square-wave signal of frequency $f_i$.

A computer determines the half periods $T_i$ ($i=1, 2, \ldots, n$) from the doppler frequency components in n different directions with respect to the motion of the sonar transmitter/receiver, taking into account the effect of roll motions to which the sonar transmitter/receiver is subjected.

If the sonar transmitter/receiver is provided with m radially directed receiver channels suitable for the reception of sonar signals of frequency $f_{oi} = f_z + f_{di} + f_{edi}$, where $i = 1, 2, \ldots, m$; $f_z$ the transmitting frequency of the sonar transmitter; $f_{di}$ the doppler frequency of a target observed in receiver channel i, and $f_{edi}$ the doppler frequency in receiver channel i due to the motion of the sonar transmitter/receiver, and if each of the m receiver channels comprise a mixer for transposing the sonar signals of frequency $f_{oi}$ to those of frequency $f_{di}$, the digitally controlled oscillator according to the invention produces all of the required mixing frequencies $f_z + f_{edi}$ for the various receiver channels. The half periods are expressed by: $T_i = 1/[2(f_z + f_{ed})_i]$, where $i = 1, 2, \ldots, n$, while $n \leq m$; for the m receiver channels may be reduced to n groups, all displaying variations in the doppler frequency components, which variations are within fixed limits of accuracy.

BRIEF DESCRIPTION OF THE DRAWINGS

The digitally controlled oscillator and the application thereof in a sonar transmitter/receiver will be further described with reference to the accompanying figures, of which.

DESCRIPTION OF THE PREFERRED EMBODIMENT

Figure 1:
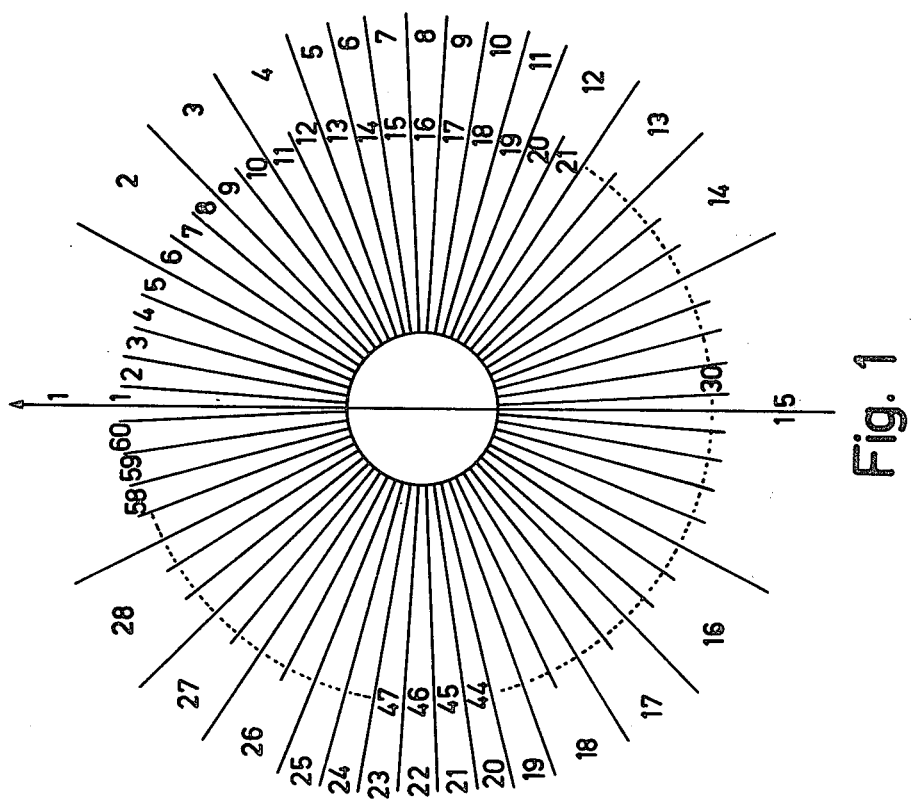
FIG. 1 illustrates schematically the orientation of the m sonar receiver channels and a manner in which these channels are reduced to n groups.

The orientation of m=60 sonar receiver channels is shown in FIG. 1. Hence, each receiver channel covers an angle of 6°. Channel 1 corresponds with an orientation in the direction of motion of the sonar transmitter/receiver indicated by the arrow. In this channel the doppler shift is a maximum, whereas the variation in the doppler shift over the 6° angle covered by channel 1 is a minimum. Channel 16 corresponds with an orientation perpendicular to the direction of motion of the sonar transmitter/receiver. In contrast with the above, in this channel the doppler shift is a minimum, while the variation in the doppler shift over the angle covered by channel 16 is a maximum. All this will be clear, as the doppler shift follows a cosine function with respect to the direction of motion of the sonar transmitter/receiver. The angles covered by the various sonar receiver channels can now be grouped to n new angular values (28 in the case in question), where the variation in the doppler shift over these—mutually varying—angles approximates that over the angle covered by receiver channel 16. This will be the case if the new angular value 1 comprises the angles covered by receiver channels 1, 2, 3, 4, 5, 57, 58, 59 and 60, the new angular value 2 the angles covered by receiver channels 6, 7 and 8, etc. To compensate for the frequency error in the target return signals detected in the 60 sonar receiver channels, which error is due to the doppler shift by the motion of the sonar transmitter/receiver, only 28 doppler shifts are determined.

Figure 2:
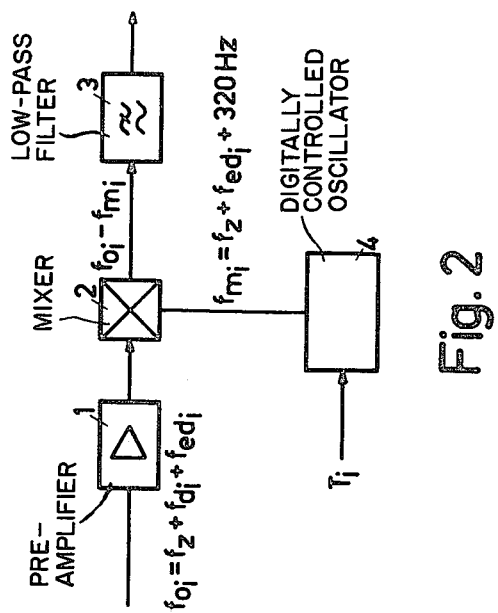
FIG. 2 is a block diagram showing a part of a sonar receiver channel.

A part of a sonar receiver channel (channel i) is illustrated in FIG. 2. The incoming signal is of frequency $f_{oi} = f_z + f_{di} + f_{edi}$, where $f_z$ is the transmitting frequency of the sonar transmitter, $f_{di}$ the doppler frequency of a target observed in receiver channel i, and $f_{edi}$ the doppler frequency in the receiver channel i due to the motion of the sonar transmitter/receiver. The incoming signal is amplified in the preamplifier 1 and transposed to a lower frequency through the mixer 2. In the first instance the mixing frequency $f_{mi}$ will be equal to $f_z + f_{edi}$, resulting in the frequency $f_{di}$ from the mixer. Since this frequency may be positive or negative, it is desirable to take $f_{mi} = f_z + f_{edi} + \Delta f Hz$ as mixing frequency, in view of the further processing of the detected signals. In the case in question $\Delta f = 320$ Hz; this value is based on the doppler shifts which may be incurred. The signals from the mixer are passed through the low-pass filter 3. The frequency of the signal through filter 3 is $f_o - f_m = f_d - 320 Hz > 0$; this signal is further processed in a sonar data processor. The receiver channel part shown here is of a 60-fold design. The number of mixing frequencies can however be reduced to 28. For example, the same mixing frequency can be applied to all of the mixers in the receiver channels 1, 2, 3, 4, 5, 57, 58, 59 and 60.

All of the 28 frequencies $f_{mi}$ are provided by a digitally controlled oscillator 4. A computer, not shown in the figure, supplies oscillator 4 with half periods $T_i$ (i=1, 2 . . . , n; here n=28) corresponding with the frequencies to be generated. For the sake of simplicity, these frequencies are designated by $f_i = 1/(2T_i)$ (i=1, 2, . . . , n) instead of by $f_{mi}$.

Figure 3:
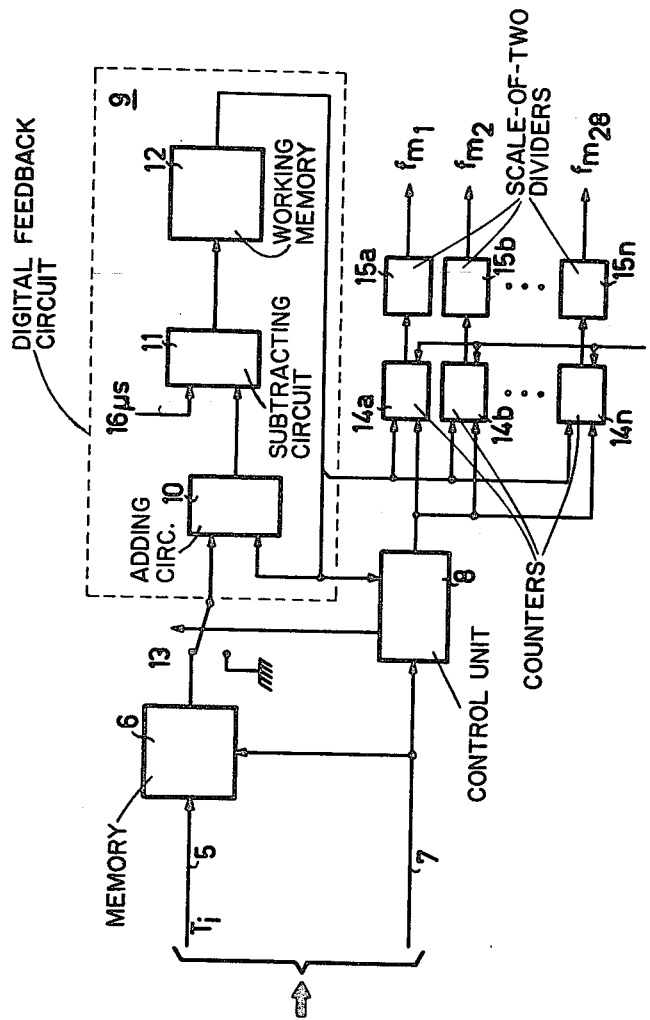
FIG. 3 is a block diagram of the digitally controlled oscillator according to the invention.

A block diagram of the digitally controlled oscillator is shown in FIG. 3. The half periods $T_i$ supplied by a computer, not shown in the figure, are fed to a memory 6 via line 5, while the appurtenant addresses are passed to a control unit 8, as well as to the memory 6, via line 7. The computer-supplied half periods are replaced at regular intervals, i.e. they are adapted to updated doppler shift calculations. The memory 6 is connected to a digital feedback circuit 9, in which the half periods taken from memory are each decreased by a fixed time value $\tau$ on a time sharing basis, and in which circuit, as soon as the residual values $\Delta_{i,1} = T_i - k_{i,1}\tau < \tau$, where $k_{i,1}$ is an integer are obtained, these residual values are increased by the corresponding half periods $T_i$ also on a time sharing basis, and each value so increased is repeatedly decreased by the fixed time $\tau$, whereby after the process of increasing by $T_i$ and repeatedly decreasing by $\tau$ has been performed j times the residual values can be expressed by: $\Delta_{i,j} = T_i + \Delta_{i,j-1} - k_{i,j}\tau$, where each value for $k_{i,j}$ is so large that $0 \leq \Delta_{i,j} < \tau$. The digital feedback circuit 9 thereto comprises an adding circuit 10, a subtracting circuit 11 and a working memory 12. If the control unit 8 has established that the residual values $\Delta_{i,j} < \tau$, this unit brings the switch 13 into the position indicated in FIG. 3, with the result that the half-periods $T_i$ are supplied to the feedback circuit 9 and supplied to the adding circuit 10 of this feedback circuit. The new value $\Delta_{i,j} + T_i$ given by the adding circuit is decreased by $\tau$ every $\tau$ seconds until $T_i - k_{i,1}\tau < \tau$. The value obtained each time after decreasing by $\tau$, viz. $T_i - k_{i,1}\tau$, is placed into the working memory 12 and reapplied to the subtracting circuit 11 via the adding circuit 10. The value from the working memory 12 is also applied, either fully or partially, to the control unit 8, which establishes whether the condition $T_i - k_{i,1}\tau < \tau$ has been satisified. If so, the value $T_i$ is added to the residual value $\Delta_{i,1} = T_i - k_{i,1}\tau$ via the switch 13 and the repetitive process of subtraction is resumed. When the process of addition by $T_i$ and repeatedly decreasing by $\tau$ has been performed j times, the residual value may be expressed by: $\Delta_{i,j} = T_i + \Delta_{i,j-1} - k_{i,j}\tau$, where $k_{i,j}$ is so large that $0 \leq \Delta_{i,j} < \tau$. The entire process hitherto described is performed for all applied half periods "simultaneously", i.e. on the basis of time sharing. Therefore, the working memory 12 always contains n numbers $\Delta_{i,j}$, where i=1, 2, . . . , n. Each time when these numbers $\Delta_{i,j} < \tau$, they are fed to the residual value counters 14a–n connected to the digital feedback circuit 9. The residual values $\Delta_{i,j}$ are distributed over these counters by the control unit 8. When these counters reach a certain value, e.g. they are counted down to zero, they deliver a pulse to a circuit connected to the respective counter. The circuits connected to the residual value counters 14a–n are designated by 15a–n and function as scale-by-two dividers, producing the frequencies $f_i$. In the system here described the coarse counting of the half periods (i.e. at time intervals $\tau$) occurs on the basis of time sharing, and the fine counting of the part of these times, remaining after the coarse counting, takes bplace in separate counters.

To illustrate the operation of the digitally controlled oscillator an example with numbers is shown below. For this purpose it will be sufficient to consider only one half period.

If $T_i = 50.578125$ μsec, or expressed in 12 bits by 110010100101, with the most significant bits $b_{12} = 32$ μsec and $b_{11} = 16$ μsec and $\tau = 16$ μsec. After three times of decreasing by $\tau$: $\Delta_{i,1} = T_i - 3\tau = 2.578125 < \tau$, which may be expressed digitally as $\Delta_{i,1} = 000010100101$. $\Delta_{i,1} < \tau$ if both $b_{12}$ and $b_{11}$ are 0; this is established in the control unit 8, which ensures that the value $T_i$ is reapplied from the memory 6 to the adding circuit 10 via the switch 13. The adding circuit 10 will then contain the value $T_i + \Delta_{i,1} = 110101001010$. After three times of decreasing by $\tau$: $\Delta_{i,2} = T_i + \Delta_{i,1} - 3\tau < \tau$; $\Delta_{i,2} = 000101001010$.

Similarly: $\Delta_{i,3} = 000111101111$
$\Delta_{i,4} = 001010010100$
$\Delta_{i,5} = 001100111001$
$\Delta_{i,6} = 001111011110$
$\Delta_{i,7} = 000010000011$
$\Delta_{i,8} = 000100101000$ etc.

A part of these residual values are supplied to a counter 14i. Since bits $b_{12}$ and $b_{11}$ are always 0, they may be omitted. However, bits $b_1$, $b_2$ and $b_3$ are also omitted, as otherwise the residual value counter must be counted down to zero at a frequency of 64 MHz, corresponding with the value of $b_1 = 15.625$ nsec. By feeding the residual value counter with he bits $b_{4-10}$, the countdown frequency of the counters need only be 8 MHz.

Bits $b_{4-10}$ of the sequantially appearing residual values are:
0010100
0101001
0111101
1010010
1100111
1111011
0010000
0100101 etc.

These values are successively fed to the residual value counter 14i, which is subsequently counted down to zero, thereafter producing a pulse which is used as clock pulse for a scale-of-two divider 15i connected thereto.

The counter 14i delivers the first pulse after a time of $3\tau$ increased by the time required for counting down the residual value 0010100 to zero at a frequency of 8 MHz, i.e. after the expiration of 50.500 μsec.

The counter 14i delivers the second pulse after a time $6\tau$ increased by the time required for counting down the residual value 0101001 to zero, i.e. after the expiration of 101.125 μsec.

The third pulse is delivered after a time $9\tau$ increased by the residual value 0111101, i.e. after the expiration of 151.625 μsec.

Similarly, a fourth pulse is produced after the expiration of 202.250 μsec, a fifth pulse after 252.875μsec, a sixth pulse after 303.375 μsec, a seventh pulse after a time $6 \times 3\tau + 4\tau = 22\tau$ increased by the residual value 0010000, i.e. after the expiration of 354.000 μsec; an eighth pulse after a time $22\tau + 3\tau = 25\tau$ increased by the residual value 0100101, i.e. after the expiration of 404.625 μsec, etc.

The pulses are thus applied to the scale-of-two divider 15i with mutual intervals of respectively: 50.500

μsec, 50.625 μsec, 50.500 μsec, 50.625 μsec, 50.625 μsec, 50.500 μsec, 50.625 μsec, 50.625 μsec, etc. On continuing this series it will be found that the average value of the time between two successive pules is 50.578125 μsec and that on an average the same result will be obtained if the bits $b_1$, $b_2$ and $b_3$ in the residual value counter were not omitted. The frequency produced by the scale-of-two divider $15i$ is now $1/(2\times 50.578125) = 9.886$ kHz.

What we claim is:

1. A digitally controlled oscillator for use in a sonar transmitter/receiver comprising:

a memory, storing the half periods $T_i$ (i=1,2,...,n) of corresponding frequencies $f_i = 1/(2T_i)$ to be generated;

a digital feedback circuit connected to said memory;

said circuit decreasing each of the half periods taken from memory after a fixed time interval $\tau$ by the value $\tau$ on a time sharing basis;

n counters to count residual values;

said digital feedback circuit connected to said n residual value counters, each counter being supplied with a series of residual values $\Delta_{i,j}$;

in which circuit as soon as the residual values $\Delta_{i,1} i_i = T_i - k_{i,1} < \tau$, where $k_{i,1}$ is an integer are obtained, said residual values are increased by the corresponding half periods $T_i$ also on a time sharing basis, and each value so increased is repeatedly decreased after a fixed time interval $\tau$ by the value $\tau$ whereby after the process of increasing by $T_i$ and repeatedly decreasing by $\tau$ has been performed j times the residual values can be expressed by: $\Delta_{i,j} = T_i + \Delta_{i,j-1} - k_{i,j}\tau$, where each $k_{i,j}$ is so large that $0 \leq \Delta_{i,j} < \tau$;

a conversion circuit;

said counters on reaching a fixed value after writing of a residual value from the respective series, delivering a signal to said conversion circuit connected to the respective counter, which circuit converts the applied signals into a square-wave signal of frequency $f_i$.

2. A digitally controlled oscillator as claimed in claim 1, wherein said digital feedback circuit comprises:

an adding circuit, in which the residual values $\Delta_{i,j-1} < \tau$ are increased by the corresponding value of the half periods $T_i$; and a subtracting circuit connected to said adding circuit, in which subtracting circuit after a fixed time interval $\tau$ the applied values are decreased by the value $\tau$ and are subsequently stored in said working memory connected to said subtracting circuit, from which memory the stored values are fed back to said subtracting circuit via said adding circuit until the obtained residual values $\Delta_{i,j} < \tau$, whereupon said residual values are again increased by $T_i$ in said adding circuit.

3. A digitally controlled oscillator as claimed in claim 2, further including:

a control unit which in response to the time values stored in said working memory, effectuates that the residual values $\Delta_{i,j-1}$ applied to the adding circuit are increased by the corresponding half periods $T_i$ as soon as the condition $\Delta_{i,j-1} < \tau$, where i=1, 2, ..., n has been satisfied.

4. A digitally controlled oscillator as claimed in claim 3, wherein said control unit delivers the signals by which the residual values $\Delta_{i,j} < \tau$ from said working memory are fed to the corresponding residual value counters.

5. A digitally controlled oscillator as claimed in claim 4 further including:

a sonar transmitter/receiver comprising:

m radially directed receiver channels for receiving sonar signals of frequency $f_{oi} = F_z + f_{di} + F_{edi}$, where i=1, 2, ..., m; $F_z$ is the transmitting frequency of the sonar transmitter, $F_{di}$ is the doppler frequency of a target detected in receiver channel i, and $F_{edi}$ is the doppler frequency in receiver channel i due to the motion of the sonar transmitter/receiver;

a mixer for each receiver channel;

whereby each of the m receiver channels is provided with a mixer for transposing the sonar signals of frequency $f_{oi}$ to those of frequency $f_{di}$, wherein the signals of mixing frequency $f_z + f_{edi}$ for the m receiver channels are produced by said digitally controlled oscillator;

a computer;

said computer determining the half periods $T_i = 1/[2(f_z + F_{edi})]$, where i=1,2,...,n, which half periods are applied to said digitally controlled oscillator.

6. A digitally controlled oscillator as claimed in claim 5, wherein the number of frequencies (n) to be generated in said digitally controlled oscillator is smaller than or equal to the number of said recever channels (m) of said sonar transmitter/receiver.

* * * * *